US010712288B2

(12) United States Patent
Okajima

(10) Patent No.: US 10,712,288 B2
(45) Date of Patent: Jul. 14, 2020

(54) SURFACE DAMAGE INSPECTION SYSTEM FOR WORKPIECE

(71) Applicant: FANUC CORPORATION, Yamanashi (JP)

(72) Inventor: Yasushi Okajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/702,464

(22) Filed: Dec. 3, 2019

(65) Prior Publication Data
US 2020/0182802 A1  Jun. 11, 2020

(30) Foreign Application Priority Data

Dec. 7, 2018  (JP) ................. 2018-229708

(51) Int. Cl.
G01N 21/88  (2006.01)
G01N 21/95  (2006.01)

(52) U.S. Cl.
CPC ..... *G01N 21/8806* (2013.01); *G01N 21/8851* (2013.01); *G01N 21/9515* (2013.01); *G01N 2021/8887* (2013.01); *G01N 2021/9518* (2013.01)

(58) Field of Classification Search
CPC ......... G01B 11/00; G01B 11/14; G01B 11/26; G01N 21/8806; G01N 21/8851
USPC ................................................. 356/237, 300
See application file for complete search history.

(56) References Cited

U.S. PATENT DOCUMENTS

2004/0035540 A1* 2/2004 Menp ................... D21G 1/0073
162/199
2004/0095575 A1* 5/2004 Woo ................... G01N 21/9501
356/300
2011/0141272 A1* 6/2011 Uto ..................... G01N 21/9501
348/135

FOREIGN PATENT DOCUMENTS

JP 2012-068025 A 4/2012

* cited by examiner

Primary Examiner — Hung Nguyen
(74) Attorney, Agent, or Firm — Studebaker & Brackett PC

(57) ABSTRACT

A surface damage inspection system for a workpiece, to automate efficient and effective appearance inspection using imaging, includes an illumination unit that emits light to an inspection target surface from four directions including frontward and rearward directions in an X direction and rightward and leftward directions in a Y direction; an imaging unit that captures an image of the inspection target surface; a damage detection unit that detects damage at the inspection target surface using the image of the inspection target surface; a robot to which a damage inspection device including the illumination unit and the damage detection unit is attached; a table on which the workpiece is to be placed; and a controller that controls drive of the robot and the damage inspection device so as to make the damage inspection device inspect the workpiece on the table or the workpiece gripped by the robot.

2 Claims, 2 Drawing Sheets

<INSPECTION TARGET SURFACE OF WORKPIECE>　　<IMAGE OF INSPECTION TARGET SURFACE>

SURFACE DAMAGE INSPECTION SYSTEM FOR WORKPIECE

This application is based on and claims the benefit of priority from Japanese Patent Application No. 2018-229708, filed on 7 Dec. 2018, the content of which is incorporated herein by reference.

BACKGROUND OF THE INVENTION

Field of the Invention

The present invention relates to a surface damage inspection system for a workpiece.

Related Art

A workpiece machined by a machine tool has conventionally been subjected to work of removing burr and cleaning work. Then, the workpiece is subjected to various types of inspections including appearance inspection, screw inspection, three-dimensional measurement inspection, etc. (see patent document 1, for example). By doing so, a defective part is removed to allow shipment of a highly-reliable workpiece as a part.

Patent Document 1: Japanese Unexamined Patent Application, Publication No. 2012-068025

SUMMARY OF THE INVENTION

In the appearance inspection of the workpiece, an inspector generally inspects a surface of the workpiece visually to determine the presence or absence of a defect (damage) such as a flaw or a cavity.

In some cases, however, the foregoing appearance inspection conducted by visual inspection by an inspector has caused oversight of a defect such as a flaw or a cavity. Further, determination criteria are generally set finely in. response to inspection sites of a workplace (part), and this has caused erroneous determination in some cases. Additionally, in the visual inspection, an inspection result may be influenced by the skill of the inspector.

In view of the foregoing circumstances, the present invention is intended to provide a surface damage inspection system for a workpiece allowing automation of appearance inspection using imaging technique and allowing appearance inspection of a workpiece efficiently and effectively.

The present inventor has found means of conducting appearance inspection of a workpiece efficiently and. effectively, thereby completing the present invention.

(1) The present invention comprises: an illumination unit (illumination unit 10 described later, for example) that emits light (light L, described later, for example) to an inspection target surface (inspection target surface W1 described later, for example) of a surface of a workpiece (workpiece W described later, for example) as an inspection target from four directions including frontward and rearward directions in an X direction and rightward and leftward directions in a Y direction perpendicular to the X direction in a front view of the inspection target surface; an imaging unit (imaging unit 12 described later, for example) that captures an image (image 11 described later, for example) of the inspection target surface from a Z direction facing the inspection target surface; a damage detection unit (damage detection unit 15 described later, for example) that detects damage at the inspection target surface using the image of the inspection target surface acquired by the imaging unit; a robot (appearance inspection robot 7 described later, for example) to which a damage inspection device (damage inspection device 9 described later, for example) including the illumination unit and the damage detection unit is attached; a table (inspection table 5 described later, for example) on which the workpiece as the inspection target is to be placed; and a controller (controller 16 described later, for example) that controls drive of the robot. The controller controls drive of the robot and the damage inspection device so as to make the damage inspection device inspect the workpiece as the inspection target on the table or the workpiece as the inspection target retrieved from the table and held by the robot.

(2) In the foregoing (1), the present invention may comprise an inspection region setting unit (inspection region setting unit 18 described later, for example) that recognizes a machined surface of the surface of the workpiece through machine learning, and sets the machined surface identified through the machine learning as an inspection region.

According to the present invention, light is applied to the inspection target surface of the workpiece from the four directions including the frontward and rearward directions in the X direction and the rightward and leftward directions in the Y direction. Thus, unlike in a conventional image, a defect (damage) such as a flaw or a cavity can be reflected (shown) clearly compared to dirt, etc. This achieves automation of appearance inspection using imaging technique and allows implementation of appearance inspection of a workpiece efficiently and effectively.

DETAILED DESCRIPTION OF THE INVENTION

A surface damage inspection system for a workpiece according to an embodiment of the present invention will be described below by referring to FIGS. 1 to 3.

This embodiment relates to a system. for inspection to determine the presence or absence of a defect such as a flaw or a cavity (a cavity in a material such as a casting) at a surface of a workpiece machined by a machine tool.

A workpiece as an inspection target is machined by a machine tool, for example, then placed on a pallet, transported into an uninspected part distributed warehouse of an automated warehouse by an automated guided vehicle (AGV), for example, and stored into a predetermined stacker rack (parcel rack) by a stacker crane provided in the uninspected part distributed warehouse.

Figure 1:
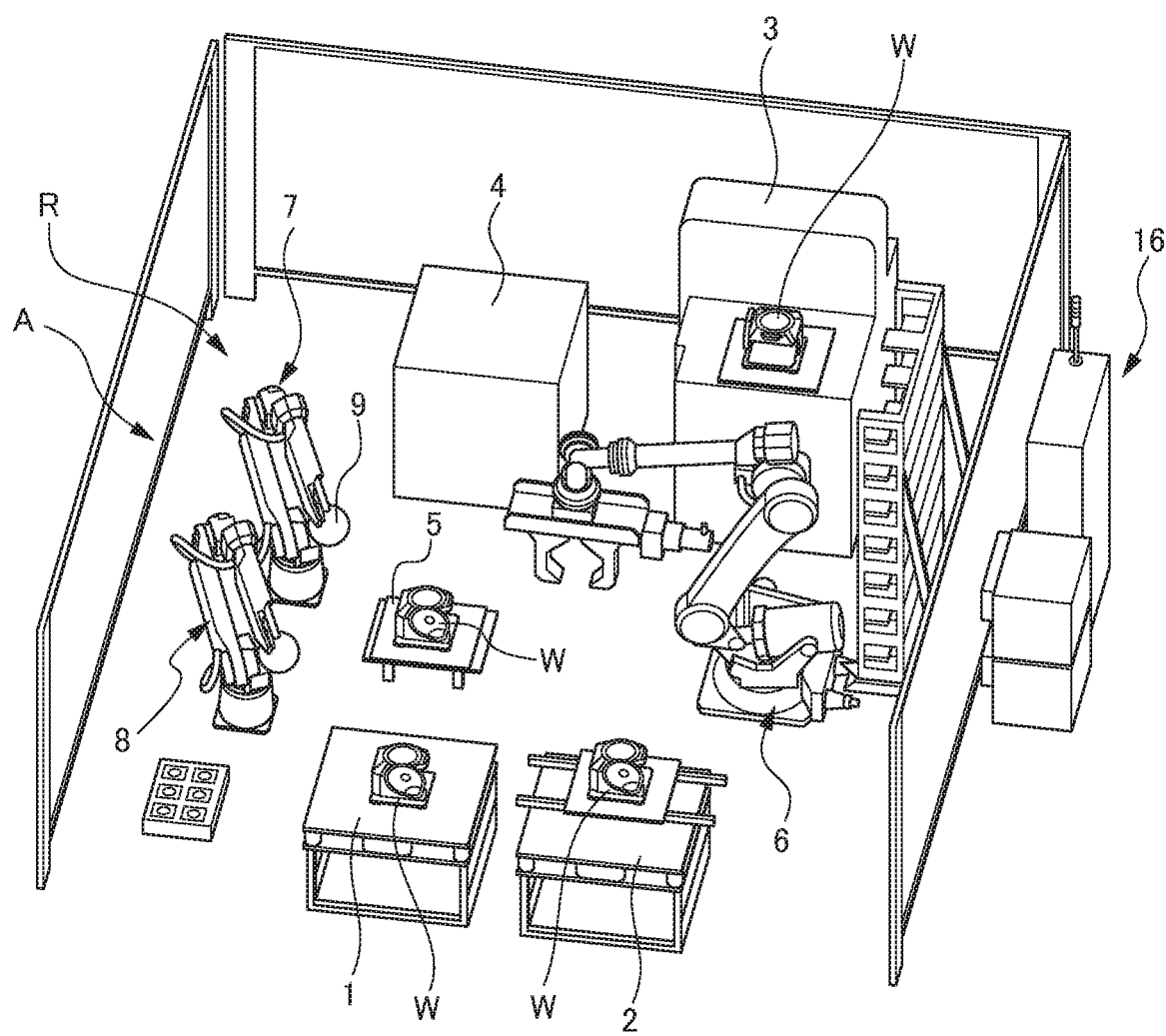
FIG. 1 shows a region for appearance inspection, etc. including a surface damage inspection system for a workpiece according to an embodiment of the present invention.

As shown in FIG. 1, a surface damage inspection system A for a workpiece according to this embodiment is provided in an appearance inspection region (a region for appearance inspection, etc.) R adjacent to the uninspected part distributed warehouse, for example.

The surface damage inspection system A for a workpiece includes: a temporary placement table 1 and a temporary placement table 2 arranged at predetermined positions in the appearance inspection region R; a cleaning unit 3 for cleaning a workpiece W; an air blow unit 4 for removing a cleaning fluid from the cleaned workpiece W; an inspection table (table) 5 on which the cleaned workpiece W is to be placed; a handling robot 6 for transporting the workpiece W between the temporary placement table 1 or 2, the cleaning unit 3, the air blow unit 4, and the inspection table 5; and an appearance inspection robot 7 for conducting appearance inspection of the workpiece 8 transported to the inspection table 5.

In this embodiment, the appearance inspection region and a screw inspection region are set in the same region R. As shown in FIG. 1, a screw inspection robot 8 for screw inspection of a female screw hole in the workpiece W and the appearance inspection robot 7 are arranged side by side. The appearance inspection robot 7 and the screw inspection robot 8 are configured to conduct respective inspections of the workpiece W transported to the inspection table 5.

The appearance inspection robot 7 is formed as a robot with an articulated arm, and has a tip portion configured to be movable freely within a predetermined range in all directions. A damage inspection device (appearance inspection device) 9 such as that shown in FIG. 2 is attached to the tip portion of the appearance inspection robot 7.

Figure 2:
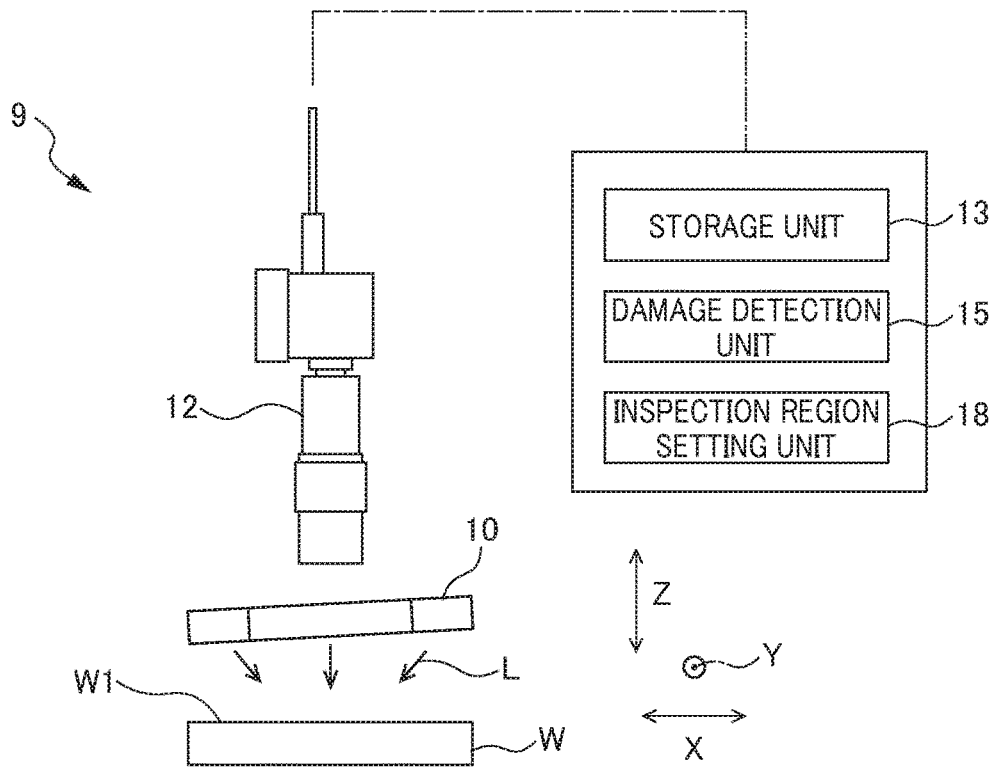
FIG. 2 shows the surface damage inspection system for a workpiece according to the embodiment of the present invention.
Figure 3:
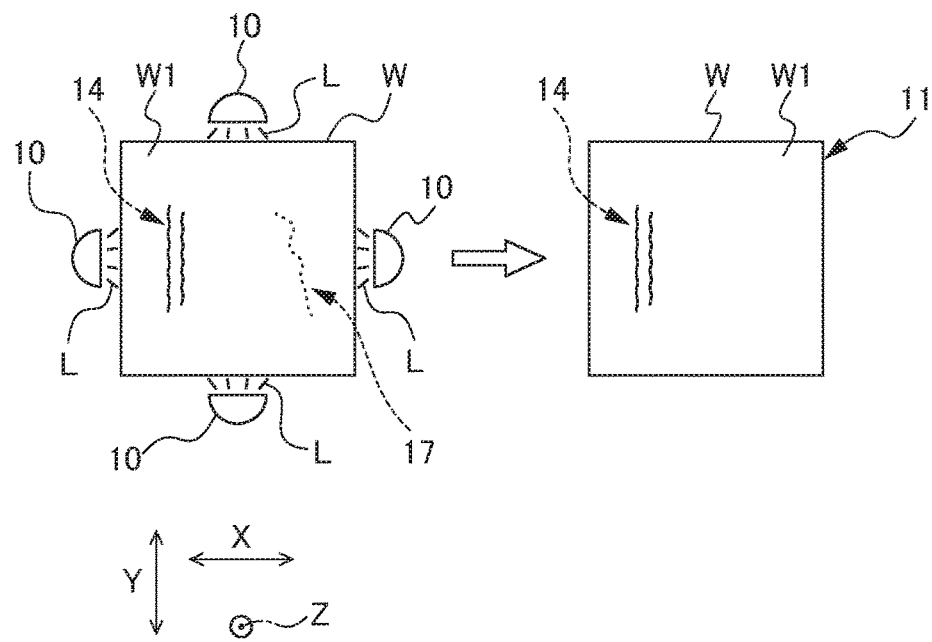
FIG. 3 shows an inspection target surface (with flaw and dirt) of a surface of a workpiece and an image of the inspection target surface of the surface of the workpiece captured by the surface damage inspection system for a workpiece according to the embodiment of the present invention.

As shown. in FIGS. 2 and 3, the damage inspection device 9 includes: an illumination unit 10 that emits light L to an inspection target surface W1 of a surface of the workpiece W as an inspection target from four directions including frontward and rearward directions in an X direction and rightward and leftward directions in a Y direction perpendicular to the X direction in a front view of the inspection target surface W1; an imaging unit 12 such as a CCD that captures an image 11 of the inspection target surface W1 from a Z direction facing the inspection target surface W1; a storage unit 13 that stores the image 11 of the inspection target surface W1 acquired by the imaging unit 12; and a damage detection unit 15 that detects a defect (damage) 14 such as a flaw or a cavity at the inspection target surface W1 using the image 11 of the inspection target surface W1.

As shown in FIG. 1, the surface damage inspection system A for a workpiece according to this embodiment further includes a controller 16 that controls drive of the appearance inspection robot 7 and the damage inspection device 9 so as to make the damage inspection device 9 inspect the workpiece W on the inspection table 5 or the workpiece W retrieved from the inspection table 5 and held by the appearance inspection robot 7.

In the surface damage inspection system A for a workpiece according to this embodiment, the image 11 of the inspection target surface W1 acquired by the imaging unit 12 of the damage inspection device 9 is stored into the storage unit 13, and the damage detection unit 15 processes the image 11 of the inspection target surface W1 stored in the storage unit 13 to determine the presence or absence of the defect 14 such as a flaw or a cavity.

For this determination, as shown in FIGS. 2 and 3, the damage detection unit 15 processes the image 11 captured by emitting the light L from all directions including two directions of frontward and rearward directions and two directions of rightward and leftward directions. Alternatively, the damage detection unit 15 combines images 11 captured by emitting the light L from corresponding ones of the directions including the two directions of the frontward. and rearward directions and the two directions of the rightward and leftward directions.

Thus, if there are dirt 17 such as dirt of a Magic Marker and the flaw (defect) 14 at the inspection target surface W1 as shown in FIG. 3, for example, the surface damage inspection system A for a workpiece according to this embodiment is capable of showing the flaw (defect) 14 clearly and conversely, preventing the dirt 17 from being shown clearly in the image 11 of the inspection target surface W1.

The surface damage inspection system A for a workpiece according to this embodiment may include an inspection region setting unit 18 that recognizes a machined surface of the surface of the workpiece W through machine learning. More specifically, a machined surface resulting from machining on a material surface of a material such as a raw casting is identified through machine learning, and the identified machined surface is set as an inspection region, eventually as the inspection target surface W1.

By doing so, a surface of a workpiece required to be inspected can be subjected to damage inspection efficiently.

As described above, the surface damage inspection system A for a workpiece according to this embodiment achieves automation of appearance inspection using imaging technique and allows implementation of appearance inspection of a workpiece efficiently and effectively.

While the one embodiment of the surface damage inspection system according to the present invention has been described above, the present invention should not be limited to the foregoing one embodiment but can be changed, where appropriate, within a range not deviating from the substance of the invention.

EXPLANATION OF REFERENCE NUMERALS

3 Cleaning unit 4 Air blow unit 5 Inspection table (table) 6 Handling robot 7 Appearance inspection robot (robot) 8 Screw inspection robot 9 Damage inspection device 10 Illumination unit 11 Image 12 Imaging unit 13 Storage unit 14 Defect (flaw, etc.) 15 Damage detection unit 16 Controller 17 Dirt 18 Inspection region setting unit A Surface damage inspection system for workpiece L Light R Region for appearance inspection, etc. W Workpiece W1 Inspection target surface (inspection region)

What is claimed is:

1. A surface damage inspection system for a workpiece comprising:

an illumination unit including four illumination elements that emit light simultaneously to an inspection target surface of a surface of a workpiece as an inspection target from four directions including frontward and rearward directions in an X direction and rightward and leftward directions in a Y direction perpendicular to the X direction in a front view of the inspection target surface;

an imaging unit that captures an image of the inspection target surface from a Z direction facing the inspection target surface;

a damage detection unit that detects damage at the inspection target surface using the image of the inspection target surface acquired by the imaging unit;

a robot to which a damage inspection device including the illumination unit and the damage detection unit is attached;

a table on which the workpiece as the inspection target is to be placed; and a controller that controls drive of the robot, wherein the controller controls drive of the robot and the damage inspection device so as to make the damage inspection device inspect the workpiece as the inspection target on the table or the workpiece as the inspection target retrieved from the table and held by the robot.

2. The surface damage inspection system for a workpiece according to claim 1, comprising an inspection region setting unit that recognizes a machined surface of the surface of the workpiece through machine learning, and sets the machined surface identified through the machine learning as an inspection region.

\* \* \* \* \*